(No Model.) 2 Sheets—Sheet 2.
W. E. LUTZ & T. KOPP.
ATTACHMENT FOR BICYCLES.
No. 496,266. Patented Apr. 25, 1893.
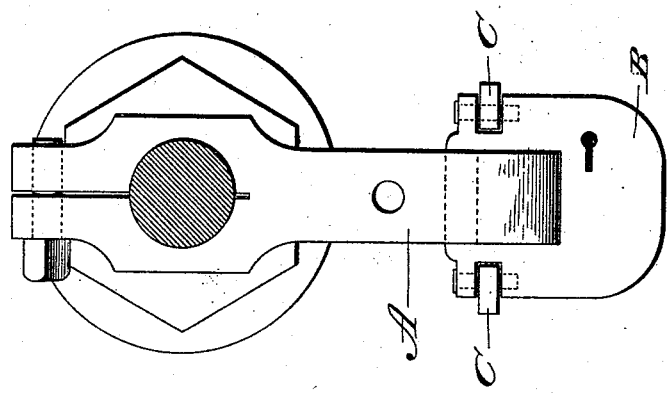
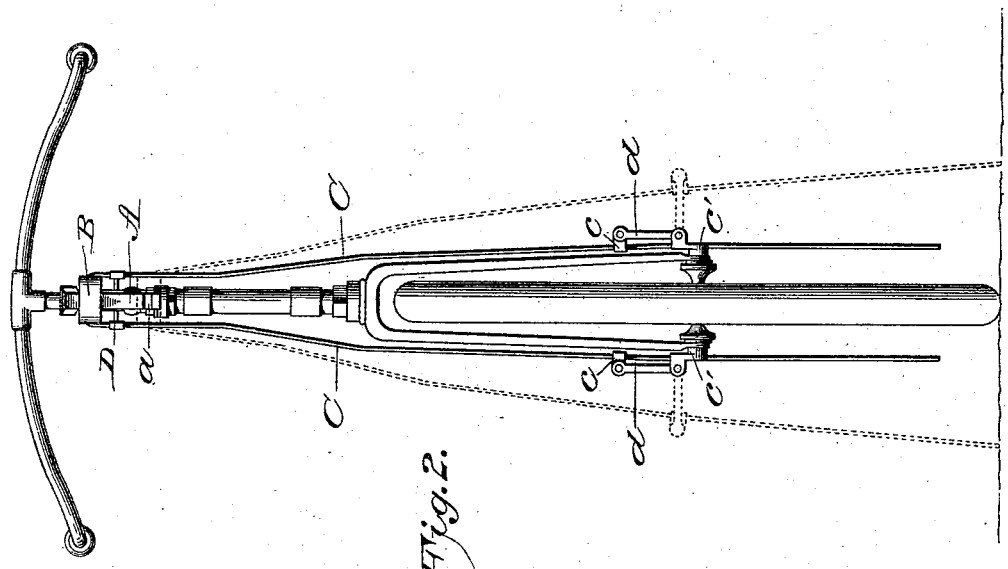

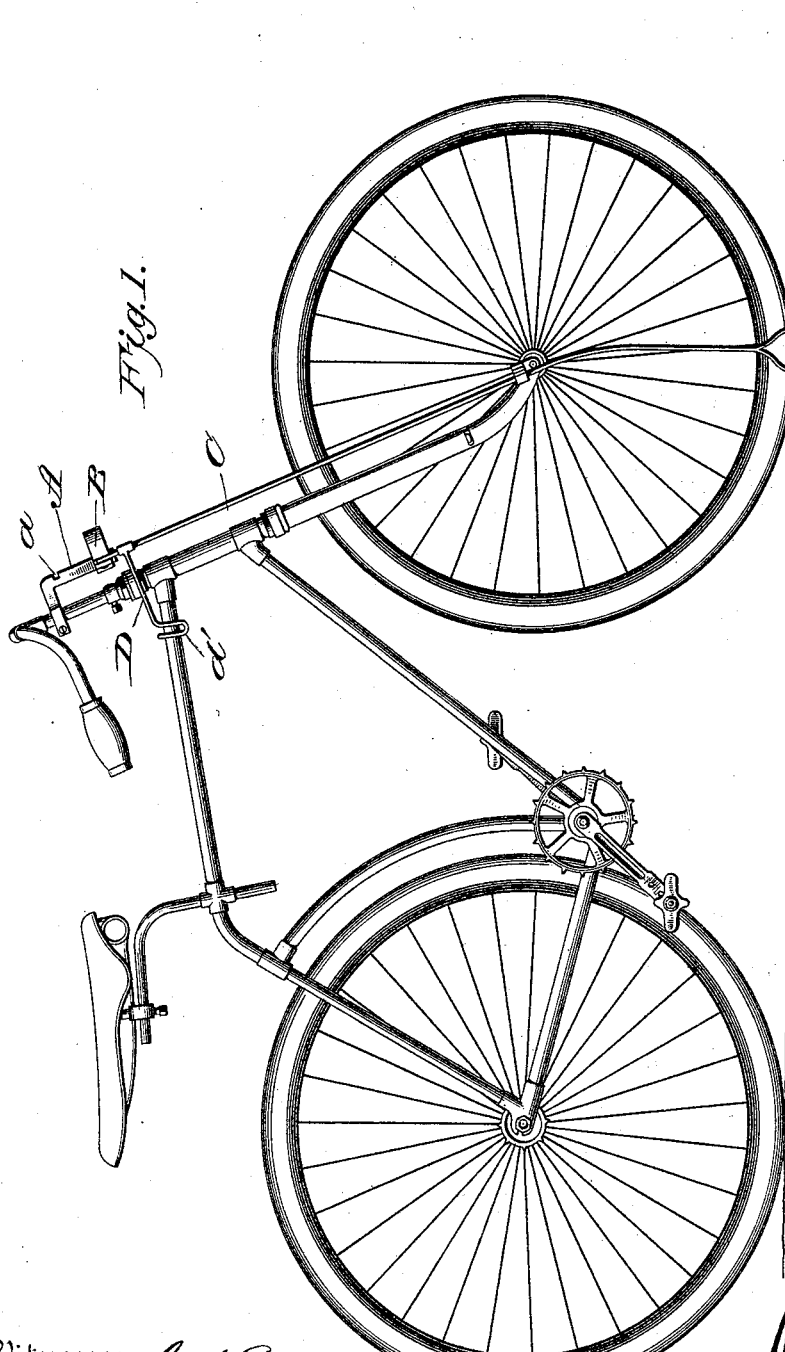

UNITED STATES PATENT OFFICE.

WILLIAM E. LUTZ AND THEODORE KOPP, OF PHILADELPHIA, PENNSYLVANIA.

ATTACHMENT FOR BICYCLES.

SPECIFICATION forming part of Letters Patent No. 496,266, dated April 25, 1893.

Application filed November 10, 1892. Serial No. 451,493. (No model.)

*To all whom it may concern:*

Be it known that we, WILLIAM E. LUTZ and THEODORE KOPP, citizens of the United States of America, residing at Philadelphia, in the county of Philadelphia and State of Pennsylvania, have invented certain new and useful Improvements in Attachments for Bicycles; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in bicycles; the object of the same being to provide a combined lock and support for a bicycle, which is carried by the steering post and front forks so that when lowered the supporting legs will be caused to spread and contact with the ground and a part of the attachment engage with the frame of the bicycle to lock and prevent the steering post being moved; and the invention consists in the construction and combination of the parts, as will be hereinafter fully set forth, and particularly pointed out in the claims.

In the accompanying drawings, forming part of this specification: Figure 1 is a side view showing the attachment lowered in a position to lock the frame and spread the supporting legs to support the bicycle. Fig. 2 is a front elevation showing the supports elevated.

The attachment is adapted to be applied to bicycles of ordinary construction.

A designates an angle bar the upper member of which is apertured for the passage of the brake-bar, and rear of said aperture the member is bifurcated and provided with a bolt and nut so that it can be rigidly clamped to the steering post. The depending member of this angle-bar is provided with notches or recesses $a$ $a$ into which the bolt of the lock B is thrown, said lock having an aperture through which the depending member passes, upon which it slides. This lock may be of any suitable construction, and the bolt can be operated either by a key or otherwise.

To the lock on each side of the angle-bar is pivoted a supporting leg C, said legs being connected to the front fork by means of links $d$, which are pivoted to blocks $c$ and $c'$ rigidly attached to the front fork and to the legs. These supporting legs are curved rearwardly as shown, so that when they are elevated they will lie immediately in front of the foot-rests.

To the upper ends of the supporting legs is rigidly attached a loop D, which extends rearwardly behind the steering post and is provided with depending members $d'$ $d'$, so that when the attachment is lowered to support the bicycle in an upright position said depending members of the loop will embrace the forward end of the main frame and prevent the steering post being turned. The loop D where it connects with the supporting legs may have suitable adjusting devices, and the blocks $c$ may also be adjustable upon the supporting legs, so that the attachment may be applied to almost any style of safety bicycle.

When the lock B is elevated to engage with the upper recess in its supporting bar the loop and supporting legs will be raised therewith, the loop being moved out of contact with the main frame and the supporting legs moved toward the front fork so as to lie adjacent thereto, and the whole attachment being carried by the steering post and front fork will move in unison therewith and will not interfere in any manner with the free movement of the front wheel.

When it is desired to support the bicycle and lock the same, it is only necessary to release the lock-bolt and lower the lock, which movement will bring the loop D in contact with the main frame and prevent movement of the front frame, and at the same time the supporting legs will be lowered to contact with the ground and support the bicycle in an upright position, the links $d$ $d$ causing said supporting legs to spread or move away from the front wheel to engage the ground at a distance therefrom.

The device is so constructed that it can be readily attached and detached.

Having thus described our invention, what we claim as new, and desire to secure by Letters Patent, is—

1. In combination with a bicycle, an angle-bar A secured to the steering post, a lock adapted to be moved upon the angle-bar and locked upon the same, together with supporting legs C C, pivotally attached to the movable lock, and connected to the front fork, substantially as shown, and for the purpose set forth.

2. In combination with a bicycle, of supporting legs C C pivoted at their upper ends to a vertically movable lock, means for supporting said lock from the steering post so that it may be retained either raised or lowered, the supporting legs being connected to the front forks by links, whereby said supporting legs when lowered are caused to spread, and a loop carried by the legs, said loop extending rearward, where it is provided with depending portions which are adapted to engage with the main frame when the legs are lowered, substantially as shown.

3. In combination with a bicycle, bars or supporting-legs C movably connected to the steering-post and to the front forks by links, said supporting-legs being adapted to be locked in an elevated or lowered position, together with a loop carried by the supporting-legs which is adapted to engage with the main frame of the bicycle, for the purpose set forth.

4. In combination with a bicycle, an angle-bar having means for securing the same to the steering-post, a lock which engages with said angle-bar, supporting-legs C C pivoted to said lock and connected by means of links to the front fork, together with means carried by said supporting-legs, which engages with the main frame to prevent movement of the front frame, substantially as shown.

5. In combination with a bicycle, an angle-bar A having a front depending member with notches or recesses a, a lock adapted to be moved upon said member, the bolt of said lock engaging either one of the recesses, together with supporting-legs C C pivotally attached to the movable lock and connected by links to the lower portion of the front fork, substantially as shown.

6. An attachment for bicycles, consisting of an angle-bar A connected to the steering post so as to project forwardly therefrom, said angle bar carrying a lock B and supporting legs which are adapted to be moved to and from the wheel as the lock is raised and lowered, a loop extending rearwardly from the lock and supporting-legs, said loop having depending portions which are adapted to embrace the main frame, for the purpose set forth.

In testimony whereof we affix our signatures in presence of two witnesses.

WILLIAM E. LUTZ.
THEODORE KOPP.

Witnesses:
WILLIAM KÄPPLER,
JOHN C. MUELLERSCHOEN.